Sept. 2, 1958  R. F. ANDERSON  2,849,847
CAPPING APPARATUS

Filed Aug. 3, 1954  3 Sheets-Sheet 1

Inventor
Ralph F. Anderson
By McCanna and Morsbach
Attys.

Sept. 2, 1958 R. F. ANDERSON 2,849,847
CAPPING APPARATUS
Filed Aug. 3, 1954 3 Sheets-Sheet 2

Inventor
Ralph F. Anderson
By McCanna and Morsbach
Attys.

Sept. 2, 1958  R. F. ANDERSON  2,849,847
CAPPING APPARATUS
Filed Aug. 3, 1954  3 Sheets-Sheet 3
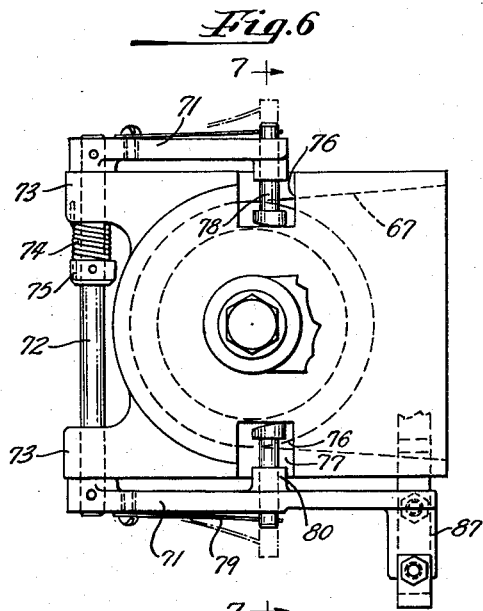
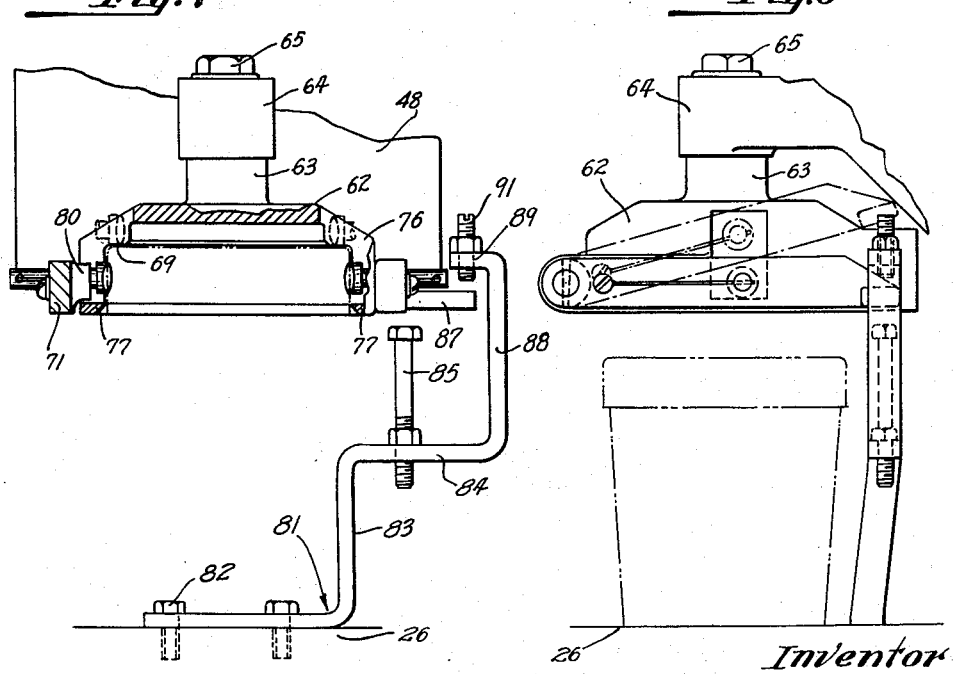
Inventor
Ralph F. Anderson
By McCanna and Morsbach
Attys United States Patent Office 2,849,847
Patented Sept. 2, 1958

2,849,847

CAPPING APPARATUS

Ralph F. Anderson, Rockford, Ill.

Application August 3, 1954, Serial No. 447,577

12 Claims. (Cl. 53—310)

This invention relates to novel and useful improvements in capping mechanisms and more particularly to an apparatus for feeding and applying skirted caps to a container.

The closure feeding and capping apparatus of the present invention is primarily intended for use with a container filling machine of the type disclosed in the patent to S. F. Anderson, 2,029,299, wherein the containers are carried by a conveyer from a loading station successively past a filling station and a capping station, the containers being momentarily elevated at each the filling station and the capping station to be respectively filled and covered and then lowered back onto the conveyer for movement therewith.

An important object of this invention is the provision of a novel cap applying apparatus for receiving and supporting a skirted cap at the capping station to apply the cap to the container as the latter is elevated at the capping station.

Another object of this invention is the provision of a cap applying apparatus which will positively eject the cap from the capper in response to elevating and lowering of the container supporting table at the capping station thereby preventing accidental removal of the cap from the container as the latter is lowered with the table.

Another object of this invention is the provision of an apparatus for feeding a skirted cap to the capping mechanism each time the container supporting table at the capping station is elevated and lowered and a capping mechanism which positively ejects the cap therefrom when the container elevating table is lowered, independent of the presence or absence of a container on the elevating table, thereby preventing jamming of the capping mechanism when a subsequent cap is fed thereto.

A further object of this invention is the provision of a novel apparatus for supplying skirted caps to the capper and including a shuttle for moving the caps into the capper operative in timed relation to the operation of the container elevating table and a mechanism for feeding the skirted caps from an inverted stack to the shuttle in an upright position, and in timed relation with the operation of the shuttle.

Still another object of this invention is the provision of a novel apparatus including a suction cup for feeding caps from an inverted stack with pneumatic control apparatus for applying a vacuum to the suction cup when the latter is in its cover seizing position and for applying pressure to the suction cup to eject the cap when the suction cup is in its discharge position.

These, together with various ancillary objects and advantages of this invention will be more readily appreciated as the same becomes better understood by reference to the following detailed description when taken in connection with the accompanying drawings wherein:

Fig. 6 is a top plan view of the capping bell;

Fig. 7 is a front elevational view of the capping bell, parts being broken away and shown in section to illustrate details of construction; and Fig. 8 is a side elevational view of the capping bell.

The capping and feeding mechanism indicated generally by the numeral 9 is adapted for use with a cup filling machine of the type wherein the containers are momentarily elevated at the capping station into the capping bell to have the cap applied thereto and the container thereafter lowered onto the conveyer for movement therewith. One such filling machine is illustrated in skeleton in the accompanying drawings and is of the type disclosed in the aforementioned patent to S. F. Anderson, 2,029,299, to which reference is made for a more complete description, it being understood that the capping apparatus may be used with various other filling machines of this general type and may within the purview of the present invention be used independent of the filling machine.

Figure 2:
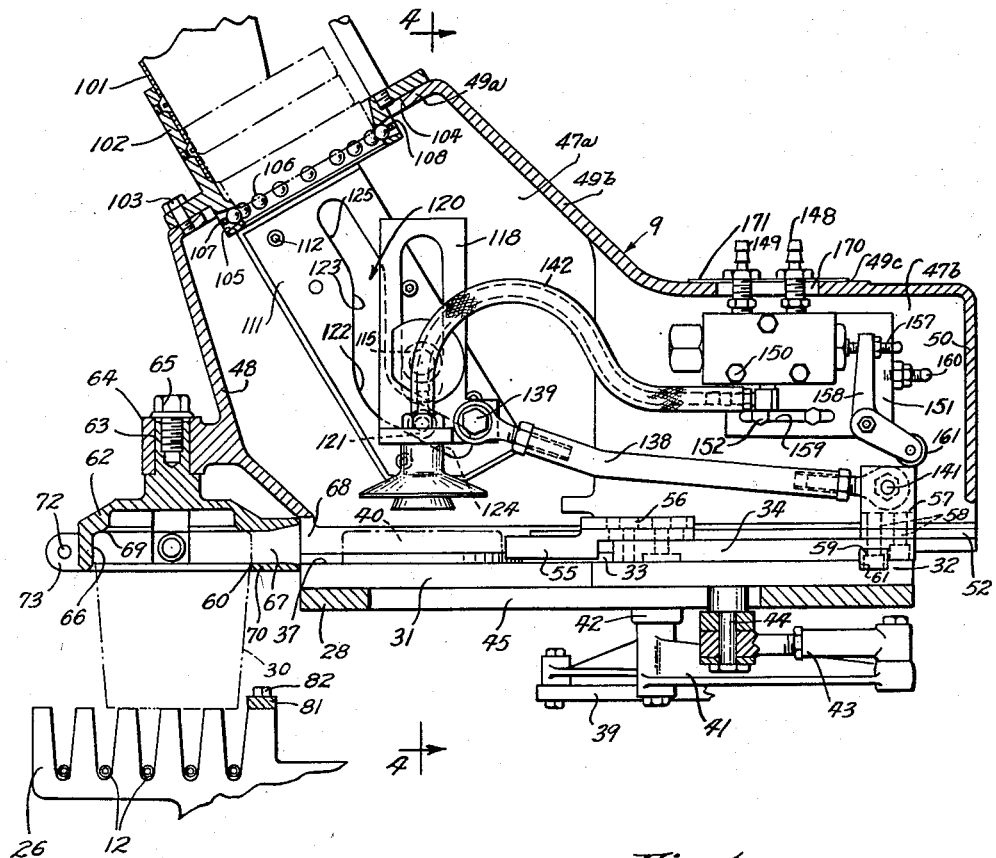
Fig. 2 is a fragmentary vertical sectional view through the capping mechanism.
Figure 1:
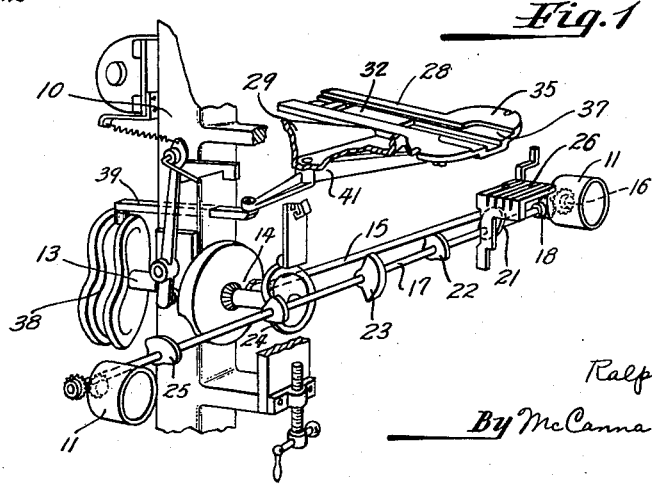
Figure 1 is a fragmentary skeleton view of a filling machine with which the capping mechanism of the present invention is adapted to be used.
Figure 3:
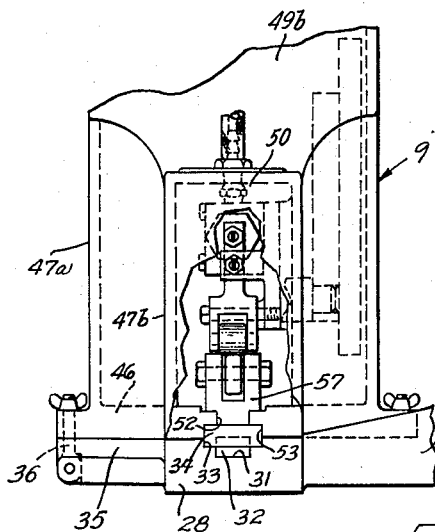
Fig. 3 is a fragmentary rear end view of the capping mechanism parts being broken away and shown in section to illustrate details of construction.

As shown in Fig. 1, the filling machine includes an upstanding frame 10 which carries a pair of rollers 11 having a plurality of endless belts 12 (see Fig. 2) entrained thereover to form a conveyer. The conveyer rollers are driven from a motor (not shown) coupled to the main drive shaft 13, through bevel gears 14, power take-off shaft 15 and through an additional set of bevel gears (not shown) which drivingly interconnect the power take-off shaft to the roller shaft 16. A cam shaft 17 is operatively connected to the roller shaft 16 by bevel gears 18 and arranged so that the cam shaft moves through one revolution for each revolution of the main drive shaft 13, which cam shaft carries a plurality of cams 21–25 arranged to engage the several elevating tables and stop members located at longitudinally spaced points along the conveyer to elevate the respective tables and stop members in timed relation with each other and with the rotation of the main drive shaft. More specifically, the cam 21 carried by the shaft 17 is arranged to engage the container elevating table 26 located at the capping station, which table is vertically movably mounted on the supporting frame 10 and has a plurality of grooves formed in the upper face thereof through which the conveyer belts 12 pass when the table is elevated.

Figure 4:
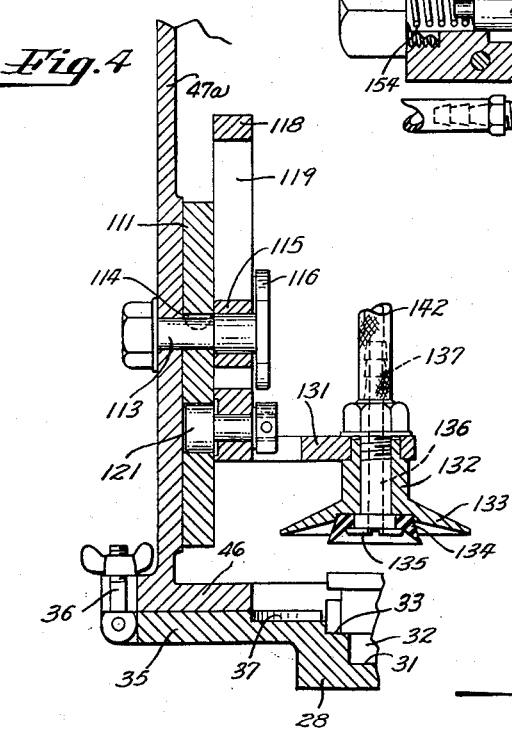
Fig. 4 is a fragmentary sectional view taken on the plane 4—4 of Fig. 2.

A slide block 28 is supported by an arm 29 on the main frame 10 and is formed with a longitudinally extending stepped groove which extends in a direction transverse the direction of movement of the conveyer and forms guideway 31 for the slide 32 and a guideway 33 in the upper face of the block 28 for slidably and guidably receiving the shuttle 34 of the capping mechanism, to be described more fully hereinafter. The forward end of the block 28 is provided with an enlarged plate 35 which carries suitable pivotally mounted wing bolts 36 by means of which the capping mechanism is detachably secured to the block. A recess is formed in the upper face of the plate and provides a cover supporting bed 37 (see Figs. 1 and 4) coplanar with the lower face of the guideway 33.

The slide 32 is reciprocated in timed relation to the elevating and lowering of the table 26 by the cam 21 so that the slide is in its retracted position when the table is elevated and the slide is in its extended position when the table is lowered. For this purpose, the slide is driven from the main drive shaft 13 through a barrel cam 38 (see Fig. 1) which reciprocates the bar 39 slidably supported on the frame 10. The bar is connected to a bell crank 41 which is pivoted intermediate its ends as at 42 to the arm 29 carried by the main frame and is otherwise connected to the slide 32 by an adjustable link 43 and pin 44 which extends through the slot 45 in the block 28, as is clearly shown in Fig. 2 of the drawings.

The capping mechanism includes a housing having a bottom wall 46, side walls 47a, a front wall 48 and a top including a downwardly and forwardly inclined wall 49a and a downwardly and rearwardly inclined wall 49b. An extension is formed on the rear end of the housing and includes sides 47b which flare outwardly and merge with the sides 47a of the housing, a top 49c which merges with the rearwardly and downwardly inclined wall 49b of the housing and a back wall 50. The bottom wall 46 of the housing has a longitudinally extending stepped slot formed therein which provides a pair of inwardly extending ribs 52. The slot below the ribs forms a guide way 53 complementary to the guideway 33 in the block 28 for slidably receiving the shuttle therebetween. The shuttle 34 carries a nose portion 55 which is slidably received between the ribs 52 and has laterally extending flanges 56 formed in the upper edge thereof which overlies the upper faces of the ribs 52 to thereby retain the forward end of the shuttle in position on the housing. A block 57 having a bifurcated upper end is secured to the rear end of the shuttle 34 as by fasteners 58, the block overlying the upper faces of the ribs 52 and having a portion slidably received therebetween whereby the block supports the rear end of the shuttle on the bottom of the housing. A key 59 is secured to the shuttle by one of the fasteners 58 and extends below the shuttle into a corresponding keyway 61 formed in the slide 34 to provide a readily detachable driving connection between the shuttle and the slide. As is apparent, the housing including the magazine, the cover feed mechanism and the shuttle may be readily detached from the slide block and thus interchanged, on the container filling machine of the type disclosed in the aforementioned Patent No. 2,029,299 with the capping mechanism disclosed in that patent.

A downwardly facing capping bell 62 having an upstanding neck 63 is received in the collar 64 carried by the forward end of the housing and secured thereto as by a stud bolt 65. The bell has a downwardly facing circular cap receiving opening 66 formed therein which flares outwardly at the lower edge 60 thereof to guide the open mouth of the container into the bell and a laterally extending passage 67 which communicates with the cap receiving opening, the sides of the passage diverging outwardly from opposite sides of the cap receiving opening into registry with an opening 68 in the front wall of the housing through which the caps are moved by the shuttle. The bell is thus fixedly supported on the housing with the bottom wall 70 of the passage 67 coplanar with the bed 37 formed in the plate 35. The bell is formed with an annular inwardly extending shoulder 69 adapted to overlie the periphery of the cap when the latter is positioned therein to support the cap 40 against upward movement in the bell as the container is moved upwardly into the cap by the elevating table.

Provision is made for supporting the cap 40 in the bell and for this purpose a pair of arms 71 is rigidly secured to a shaft 72 which is rotatably supported on the forwardly extending trunnions 73 carried by the capping bell. A coil spring 74 has one end secured as by the collar 75 to the shaft 72 and the other end fixed to one of the trunnions 73 to normally urge the arms to their lowered position. A pair of upwardly opening slots 76 is formed in the opposite sides of the capping bell above the lower edge thereof and provide a stop 77 adapted to be engaged by the inwardly extending bosses 80 on the arms to limit downward pivotal movement of the arms. Pins 78 are reciprocably mounted in the bosses 80 on the arms and biased by spring wires 79 into their innermost position. As best shown in Figs. 6 and 7, the spring wires are secured to the arms 71 and extend through transverse apertures in the pins to prevent rotation of the pins about their axes. The pins are offset from the axis of the capping bell toward the side thereof adjacent the passage 67 and the heads of the pins are beveled, as best shown in Fig. 6 forwardly and outwardly of the capping bell so that when the skirted cap is positioned therein, the heads of the pins cam the periphery of the cap into engagement with the forward edge of the cap receiving opening. In this manner the caps when inserted in the housing are supported therein by the pins 78 against the forward edge of the capping bell and with the upper edge of the cap in engagement with the inwardly extending shoulder 69.

In accordance with the present invention, the caps are positively ejected from the capping bell each time the table 26 is elevated and lowered, independent of the presence or absence of a container on the table, thereby preventing accidental removal of the cap from the container when the latter is lowered, and also preventing jamming of the capping apparatus in the event no container is presented to the capping apparatus when the table 26 is elevated. For this purpose there is provided a bracket 81 which is affixed to the elevating table 26 along the rear edge thereof as by fasteners 82, the bracket having an upstanding leg 83 and a laterally extending arm 84 which carries an adjustable stop member 85. The stop member is adapted to engage the ear 87 carried by one of the arms 71 when the elevating table 26 is raised to thereby pivot the arms upwardly to a position in which the spring biased fingers 78 may move inwardly over the top of the cover in the capping bell, as shown in dotted lines in Figs. 7 and 8. The bracket also includes a second upwardly extending leg 88 which extends upwardly from the arm 84 and has a laterally extending member 89 formed thereon which carries the adjustable stop member 91 adapted to overlie the ear 87 carried by the arms 71. The latter is adjusted to engage the ear 87 when the elevating table is lowered to thereby urge the spring biased fingers into engagement with the upper periphery of the cap and positively eject the same.

The mechanism for feeding the caps to the shuttle includes an upstanding cap magazine 101 which has an annular bracket 102 secured to the lower end thereof and which bracket is attached as by fasteners 103 to the downwardly and forwardly inclined top wall 49a of the housing, the lower end of the bracket extending through an opening 104 in the top wall into the interior of the housing. A plurality of annularly spaced sockets 105 are formed in the bracket 102 and balls 106 are positioned in each of the sockets and retained therein by an annular spring member 107 disposed in a groove 108 which intersects the sockets 105 to thereby form a yieldable construction for retaining the covers in the magazine.

The caps are disposed in the magazine in an inverted position, that is in a position in which the skirt thereon extends upwardly, and provision is made for withdrawing the caps from the magazine one at a time and for inverting the caps and feeding the same to the bed 37 forwardly of the shuttle in timed relation with the operation of the latter. For this purpose there is provided a cam plate 111 which is secured to one of the side walls 47a by fasteners 112. A pin 113 (see Fig. 4) extends through the cam plate and is non-rotatably secured thereto as by the key 114, the pin having a roller 115 disposed thereon. A suction cup supporting bracket 118 having an elongated slot 119 formed therein is guidably received on the roller 115 and retained in position on the pin by the enlarged head 116, the bracket 118 carrying a cam follower 121 which is receivable in the cam groove 120 in the cam plate 111. The cam groove includes an arcuate portion 122 which is concentric with the pin 113 and tangentially extending portions 123 and 124 which respectively extend upwardly and downwardly from the arcuate portions, an end portion 125 being formed on the upper end of the portion 123 of the cam groove, which end portion extends in alignment with the axis of the cap magazine 101.

The suction cup supporting bracket 18 carries a laterally extending arm 131 at its lower end, and a suction cup backing member 132 having a downwardly and outwardly flared skirt thereon is supported on the arm 131. A suction cup 134 is mounted concentrically of the backing member by the headed bolt 135 which extends through the latter and has a passage 136 therein which communicates with the hose coupling 137. The bracket 118 is oscillated about the roller 115 with the cam follower 121 riding in the cam groove 120 in the plate 111 to move the suction cup from its discharge position shown in Fig. 2 to a container seizing position in which the suction cup is inverted and positioned to bear against the lowermost cap in the magazine 101. This is effected by means of an adjustable link 138 which is pivotally connected by a pin 139 to the suction cup supporting bracket and by the pin 141 to the bifurcated block 57 whereby, as the shuttle is extended, the link 138 causes the bracket 118 to pivot in a clockwise direction about the pin 113 and move the suction cup upwardly into engagement with the lowermost cap in the magazine. When the shuttle is thereafter retracted, the bracket 118 is moved in a counterclockwise direction and the suction cup moved back to its discharge position shown in Fig. 2.

Figure 5:
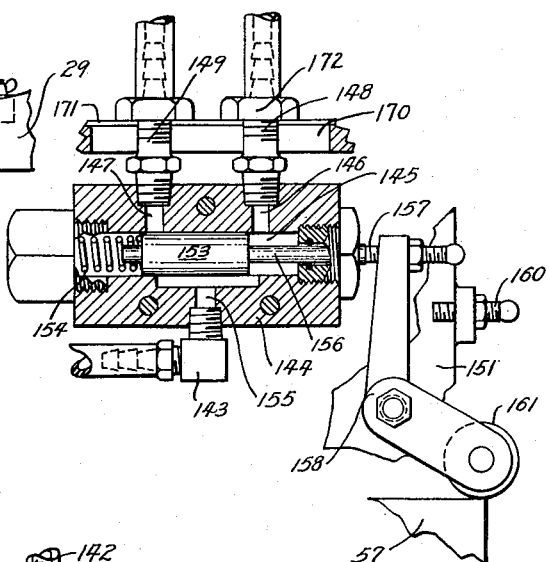
Fig. 5 is a longitudinal sectional view through the valve for controlling the application of pneumatic pressure to the suction cup.

Pneumatic pressure is applied to the suction cup 134 so that the latter positively seizes a cap from the magazine when the suction cup is in its article seizing position and thereafter positively ejects the cover from the suction cup when the latter is in its discharge position. For this purpose, the suction cup is connected through a flexible hose 142 to a coupling 143 on the two-way valve 144. The latter has a valve chamber 145 and passages 146 and 147 which are respectively connected to a source of air under pressure and to a source of vacuum through couplings 148 and 149. As is clearly shown in Figs. 2 and 5, the valve 144 is secured as by fasteners 150 to a plate 151 and the latter is mounted for adjustment longitudinally of the housing by fasteners 152 which extend through a slot 159 in the plate. An adjusting screw 160 is provided to permit accurate control of the position of the plate 151 relative to the housing. The hose couplings 148 and 149 slidably extend through a slot 170 in the housing and are adapted for connection to the respective pneumatic lines externally of the housing. A plate 171 overlies the slot 170 and is retained in position on the housing by fasteners 172 carried by the couplings. A valve member 153 is reciprocably mounted in the valve 145 and is normally biased by a spring 154 to a position to establish communication between the suction inlet passage 147 with the passage 155 leading to the suction cup. An actuating shaft 156 is connected to the valve member 153 and extends out of the housing for engagement by the adjustable finger 157 carried by the bell crank 158. The latter is pivotally mounted on the plate 151 which supports the valve and has a cam follower 161 on the end thereof remote from the adjustable finger 157, which cam follower is adapted to be engaged by the block 57 when the shuttle is moved to its retracted position to thereby move the valve member 153 to a position in which communication is established between the pressure inlet passage 146 and the passage 155 which leads to the suction cup. The shuttle 34 is thus operatively connected through link 138 to the suction cup supporting bracket to oscillate the bracket about the pin 113 and move the suction cup from its discharge position, shown in Fig. 2, to its cover seizing position, and back, each time the shuttle is extended and retracted. Further, the shuttle is operatively connected through bell crank 158 to the pneumatic control valve 144 to apply a vacuum to the cup as the cup moves into its cover seizing position so that the cup may seize the lowermost cover and remove the latter from the magazine, the vacuum being maintained on the cup until the latter has been moved to its discharge position by the shuttle at which time pressurized air is applied to the cup by the valve under the control of the shuttle as the latter moves to its retracted position, thereby positively ejecting the cover from the cup onto the bed 37 forward of the shuttle. The position of the suction cup at which pressure is applied to eject the cover is selectively variable by suitable adjustment of the plate 151 relative to the housing and also by adjusting the adjustable stop 157 relative to the bell crank.

In operation, the containers 30 are advanced by the conveyer to a position over the elevating table 26 at the capping station where movement of the containers by the conveyer is interrupted by stops (not shown) operated by the cams on cam shaft 17. The elevating table is then raised by cam 21 and moves the open mouth of the container into the skirted cover 40 previously positioned in the capping bell 62. As the container is being moved into the cover, the adjustable stop 85 carried by the table 26 engages the ear 87 and pivots the arms 71 upwardly thereby moving the spring biased fingers 78 above the cover in the bell. The springs 79 move the fingers inwardly over the top of the cover 40 and when the table is thereafter lowered, the adjustable stop 91 engages the ear 87 and pivots the arms 71 downward thereby urging the fingers against the top of the cover to positively eject the latter from the bell.

Reciprocation of the shuttle is timed with the operation of the elevating table to move the shuttle into its extended position when the table 26 is lowered and to retract the shuttle before the table is thereafter elevated. The shuttle is, in turn, operatively connected to the bracket 118 to move the suction cup to its cover seizing position when the shuttle is extended and to return the suction cup to its discharge position when the shuttle is retracted, movement of the shuttle also controlling the application of pneumatic pressure to the suction cup in timed relation to the movement thereof so that a vacuum is applied to seize and withdraw a cover from the magazine and pressurized air applied to eject the cover from the cup.

I claim:

1. In a machine for applying covers to a receptacle, a receptacle support, capping means overlying the support for applying covers to the receptacle thereon, a cover magazine for supporting covers in an inverted position, a reciprocable shuttle for moving a cover into the capping means, feed means movable between a position in which it seizes an inverted cover in the magazine and a position in which it delivers the cover in an upright position to the shuttle to be moved thereby, means operatively connecting the feed means to the shuttle for moving the feed means into its cover seizing position in response to movement of the shuttle in a direction to feed a cover to the capping means and for moving the feed means to its cover delivering position when the shuttle is moved in the opposite direction, a suction cup on said feed means, and means including a valve operative in timed relation with the reciprocation of said shuttle for applying a vacuum to the cup when the feed means is in its cover seizing position and for applying pressurized air to the cup when the feed means is in its discharge position to discharge the cover from the feed means.

2. In a machine for applying covers to a receptacle, a receptacle support, capping means overlying the support for applying covers to the receptacles thereon, a cover magazine for supporting covers in an inverted position, a reciprocable shuttle for moving a cover into the capping means, feed means movable between a position in which it seizes an inverted cover in the magazine and a position in which it delivers the cover in an upright position to the shuttle to be moved thereby, means operatively connecting the feed means to the shuttle for moving the feed means into its cover seizing position in response to movement of the shuttle in a direction to feed a cover to the capping means and for moving the feed means to its cover delivering position when the shuttle is moved in the opposite direction, a suction cup on said feed means, means including a valve for selectively applying a vacuum or pressurized air to said cup, and cam means engageable with said shuttle for operating said valve to withdraw the air from said cup when the feed means is in its cover seizing position and for admitting air to said cup when the feed means is in its cover delivering position.

3. In a machine for applying covers to a receptacle, an elongated housing having an opening in the bottom thereof, a shuttle reciprocably mounted for movement longitudinally of the housing across the opening in the bottom thereof, capping means mounted at one end of the housing having a lateral opening therein communicating with the interior of the housing and aligned with the shuttle in the direction of reciprocation thereof, a magazine for supporting a stack of covers in an inverted position mounted on the top of the housing adjacent said one end thereof, said magazine having an open bottom communicating the interior of the housing, feed means disposed within said housing movable between a position in which it seizes an inverted cover on the bottom of the stack in the magazine and a position in which it delivers the cover in an upright position to the shuttle, said shuttle upon movement in one direction advancing a cover from the housing to the capping means through said lateral opening therein, and means operatively connecting the feed means to the shuttle for moving the feed means to its cover seizing position in response to movement of said shuttle in said one direction and for moving the feed means to its discharge position in response to movement of said shuttle in the opposite direction.

4. In a machine for applying covers to a receptacle, an elongated housing having an opening in the bottom thereof, a shuttle reciprocably mounted for movement longitudinally of the housing across the opening in the bottom thereof, capping means mounted at one end of the housing having a lateral opening therein communicating with the interior of the housing and aligned with the shuttle in the direction of reciprocation thereof, a magazine for supporting a stack of covers in an inverted position mounted on the top of the housing adjacent said one end thereof, said magazine having an open bottom communicating the interior of the housing, feed means disposed within said housing movable between a position in which it seizes an inverted cover on the bottom of the stack in the magazine and a position in which it delivers the cover in an upright position to the shuttle, said shuttle upon movement in one direction advancing a cover from the housing to the capping means through said lateral opening therein, means operatively connecting the feed means to the shuttle for moving the feed means to its cover seizing position in response to movement of said shuttle in said one direction and for moving the feed means to its discharge position in response to movement of said shuttle in the opposite direction, said feed means including a suction cup, means including a valve disposed in said housing for alternately applying a vacuum and pressurized air to said cup, and cam means engageable with said shuttle for operating said valve to apply vacuum to said cup when the feed means is in its cover seizing position and for applying pressurized air to said cup when the feed means is in its cover delivering position to eject the cover from the feed means.

5. In a machine for applying covers to containers, a capping bell, a table disposed below the capping bell and movable towards and away therefrom for moving the open mouth of a container into and out of the bell, means operative in timed relation with the movement of the table for feeding covers to the bell, means including inwardly directed resiliently biased fingers on the bell engageable with the periphery of the covers for supporting the latter in the bell, means mounting the fingers on the bell for vertical movement relative to the bell, means responsive to movement of the table towards the bell for moving said fingers above the cover in the bell, and means responsive to movement of the table away from the bell for moving said fingers against the upper face of the cover in the bell to eject the latter therefrom.

6. In a machine for applying closures to containers, a vertically movable container support, a capping bell overlying said support having an opening in the side thereof for the reception of a cover, means for feeding covers into said bell through said opening, detent means extending into said bell for engagement with the periphery of a cover disposed therein to support the latter, means for effecting vertical reciprocation of the container support to apply the cover disposed in the bell onto the container carried by the support, means mounting said detent means on the capping bell for vertical movement relative thereto, means responsive to upward movement of the container support for moving the detent means upwardly relative to the capping bell and out of engagement with the periphery of the closure member disposed therein to release the closure member, and means responsive to downward movement of the container support for moving the detent means into engagement with the upper face of the cover to eject the cover from the bell.

7. In a machine for applying covers to containers, a vertically movable container support, a fixedly mounted capping bell overlying said support having an opening in the side thereof for the reception of a cover, means including a reciprocable shuttle for feeding covers into said bell through said opening, resiliently biased fingers extending into said bell for engagement with the periphery of a cover disposed therein to support the latter, means for effecting vertical reciprocation of the container support to apply the cover in the bell to the container on the support, means mounting said fingers on the bell for vertical movement relative thereto, means responsive to upward movement of the receptacle support for moving the fingers upwardly relative to the capping bell and out of engagement with the periphery of the cover disposed therein to release the cover, means responsive to downward movement of the container support for moving the fingers downwardly to eject the cover from the bell, and means for operating said shuttle and said means for reciprocating said container support in timed relation.

8. In a machine for applying covers to containers, a container support, a capping bell overlying said support having an opening in the side thereof for receiving a cover, means including a reciprocable shuttle for feeding covers into said bell through said opening, a pair of arms mounted on opposite sides of said bell for vertical pivotal movement relative thereto, resiliently biased fingers carried by said arms extending into said bell on opposite sides of said opening therein and engageable with the periphery of a cover in said bell to support the cover therein, means for effecting vertical reciprocation of said container support, means carried by said support and engageable with said arms for pivoting the latter upwardly in response to upward movement of the support to move said fingers out of engagement with the periphery of a cover in said bell, means carried by said support and engageable with said arms for positively urging the latter downwardly when the receptacle support is lowered to thereby urge the fingers against the upper face of a cover in the bell to eject the cover therefrom, and means for operating said shuttle and said support reciprocating means in timed relation.

9. In an apparatus for applying covers to containers, a capping bell having a downwardly facing circular opening and a laterally extending passage communicating with said opening, means for feeding a cover through said passage into said opening in said bell, said bell having slots in the sides thereof communicating with said opening at opposite sides of said passage, a pair of inwardly directed axially aligned fingers extending through said slots into said opening in said bell and offset from the axis of said opening on the side adjacent said passage, and means yieldably urging said fingers inwardly of said opening to form a yieldable construction therein for supporting a cover in the bell, said fingers having heads thereon beveled in a direction outwardly away from said passage for urging the periphery of the cover disposed in the bell towards the side of said opening remote from said passage to thereby center the cover in said opening.

10. In an apparatus for applying covers to containers, a container support, a capping bell overlying said support having a downwardly facing circular opening and a laterally extending passage communicating with said opening, means for feeding covers through said passage into said opening in the bell, a pair of arms mounted on said bell for vertical pivotal movement about an axis transverse to said passage, a pair of axially aligned inwardly extending fingers slidably carried by said arms extending into said opening in said bell at opposite sides of said passage and offset from the axis of said opening on the side thereof adjacent said passage, said fingers having heads thereon beveled in a direction outwardly away from said passage, spring means carried by said arms for yieldably urging said fingers inwardly of said bell to support a cover therein, means for elevating and lowering said container support to move the open mouth of a container into the cover in the bell, means responsive to elevating said support for moving said fingers above the cover in said bell, and means responsive to lowering said support for moving the fingers against the cover in the bell to eject the cover therefrom.

11. The combination of claim 10 wherein said spring means comprises a resilient wire secured at one end to the arms and extending transversely through said fingers to prevent rotation of said fingers in said arms.

12. In a machine for applying covers to a receptacle, capping means for applying covers to receptacles, a shuttle mounted for reciprocation toward and away from said capping means for moving covers into the capping means, a cover magazine for supporting covers in an inverted position, means adapted to withdraw a cover from the magazine, turn the cover to an upright position and feed the cover to the shuttle comprising a cam plate mounted adjacent the lower end of said magazine, a suction cup support arm having an elongated slot therein, a pin on said plate extending through said slot to support said arm on the plate for sliding and pivotal movement with respect thereto, a suction cup on said arm, a link connecting said shuttle to said arm to move the latter in response to reciprocation of said arm, and means including a cam track on said cam plate and a follower on said arm for moving the suction cup from a cover discharge position facing downwardly in advance of the shuttle to an inverted position at the lower end of the cover magazine and back in response to reciprocation of said shuttle between a retracted and extended position to move the cover in advance of the shuttle into the capping means.

References Cited in the file of this patent
UNITED STATES PATENTS

| | | |
|---|---|---|
| 1,943,483 | Miller | Jan. 16, 1934 |
| 2,029,299 | Anderson | Feb. 4, 1936 |
| 2,325,557 | Terry | July 27, 1943 |
| 2,349,523 | Sonnenberg | May 23, 1944 |
| 2,355,385 | Lowry | Aug. 8, 1944 |
| 2,445,713 | Glassner | July 20, 1948 |
| 2,498,443 | Naccarato et al. | Feb. 21, 1950 |
| 2,533,437 | Dennis et al. | Dec. 12, 1950 |
| 2,551,476 | Vantlander | May 1, 1951 |